C. E. HOPKINS.
APPARATUS FOR CASTING CURVED STEREOTYPES.
APPLICATION FILED FEB. 19, 1907.

980,419.

Patented Jan. 3, 1911.
16 SHEETS—SHEET 1.

Attest:

Inventor:
Charles Edward Hopkins
by Redding Kiddle & Greeley
Attys.

C. E. HOPKINS.
APPARATUS FOR CASTING CURVED STEREOTYPES.
APPLICATION FILED FEB. 19, 1907.

980,419.

Patented Jan. 3, 1911.
16 SHEETS—SHEET 6.

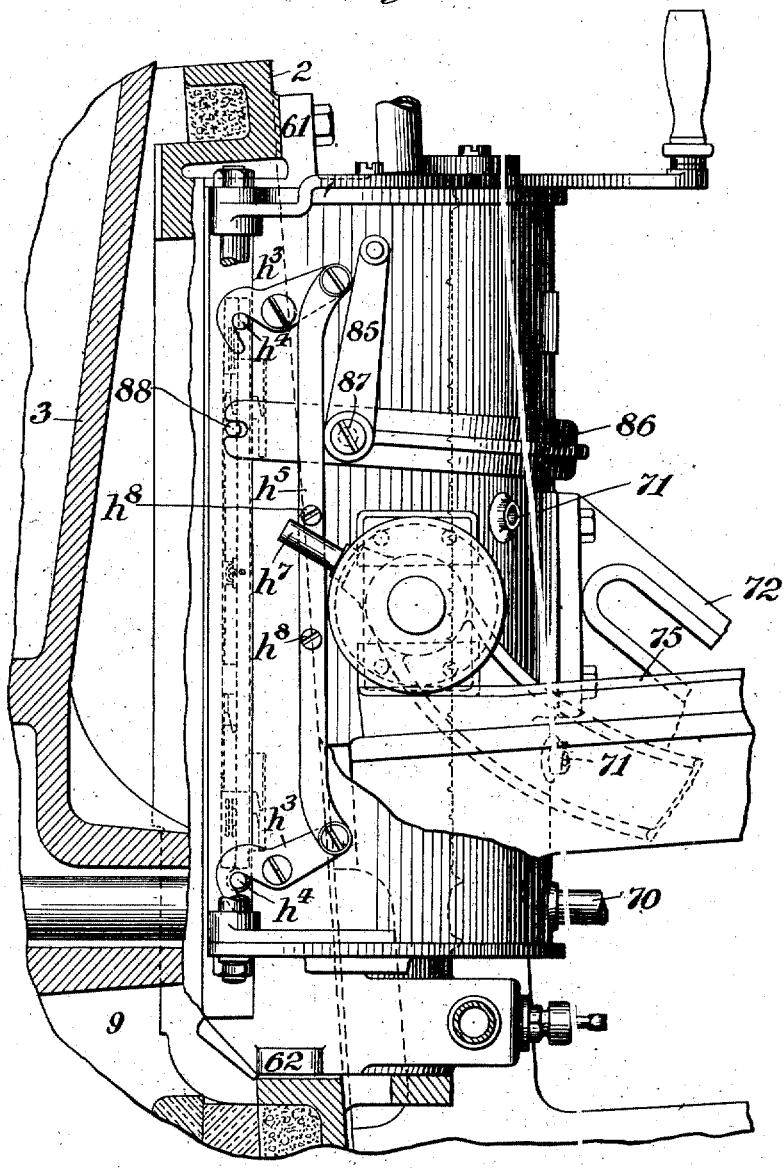

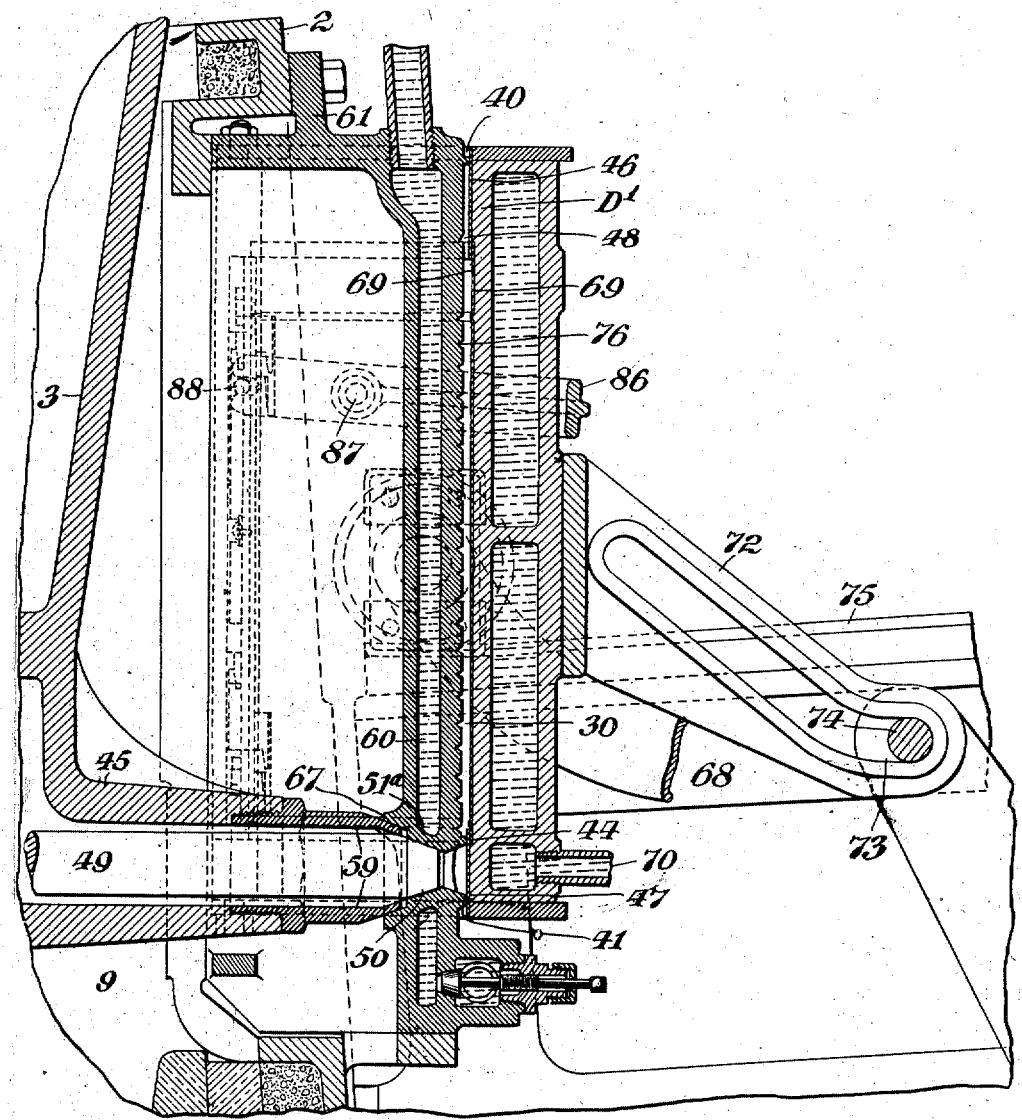

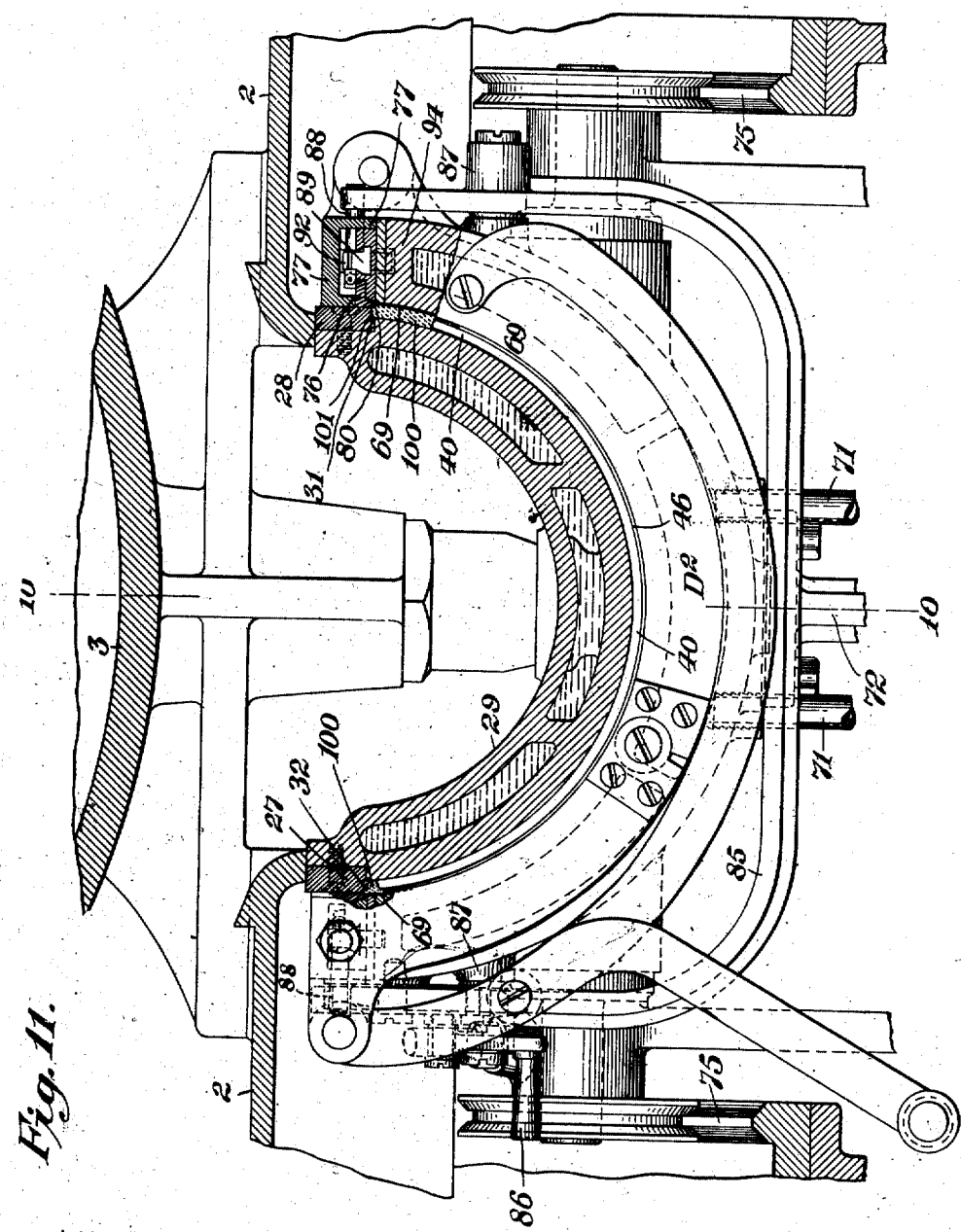

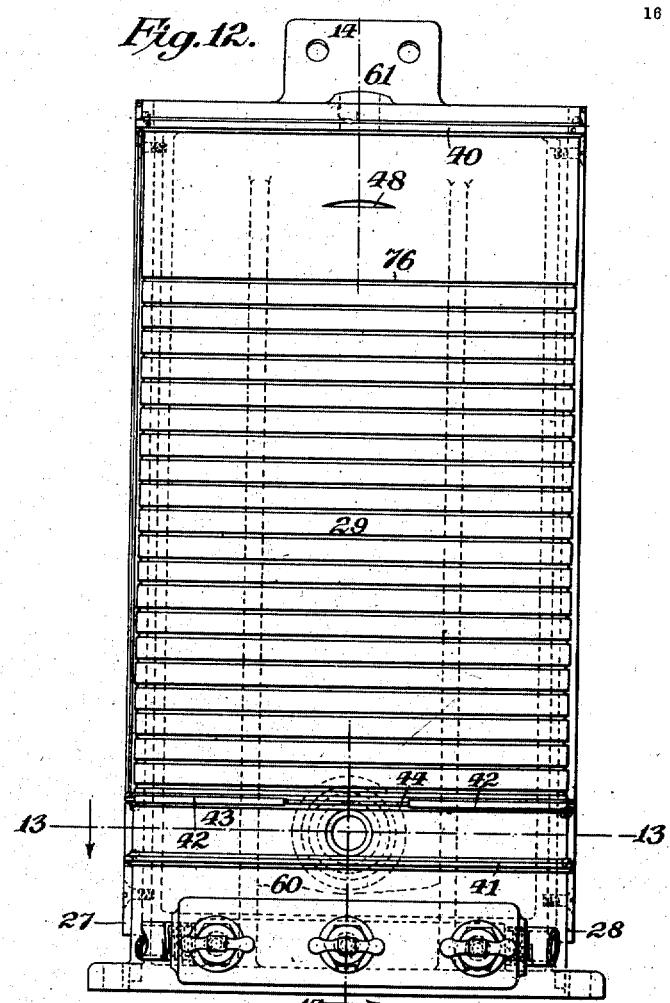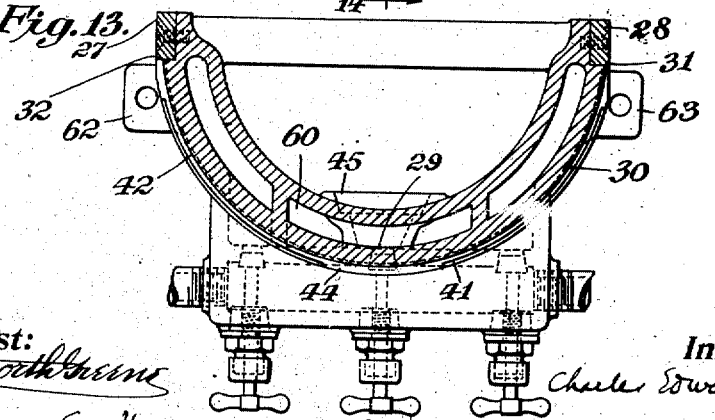

C. E. HOPKINS.
APPARATUS FOR CASTING CURVED STEREOTYPES.
APPLICATION FILED FEB. 19, 1907.

980,419.

Patented Jan. 3, 1911.
16 SHEETS—SHEET 11.

Attest:

Inventor:
Charles Edward Hopkins
by Redding Kiddle & Greeley
Atty's.

C. E. HOPKINS.
APPARATUS FOR CASTING CURVED STEREOTYPES.
APPLICATION FILED FEB. 19, 1907.
980,419.
Patented Jan. 3, 1911.
16 SHEETS—SHEET 12.
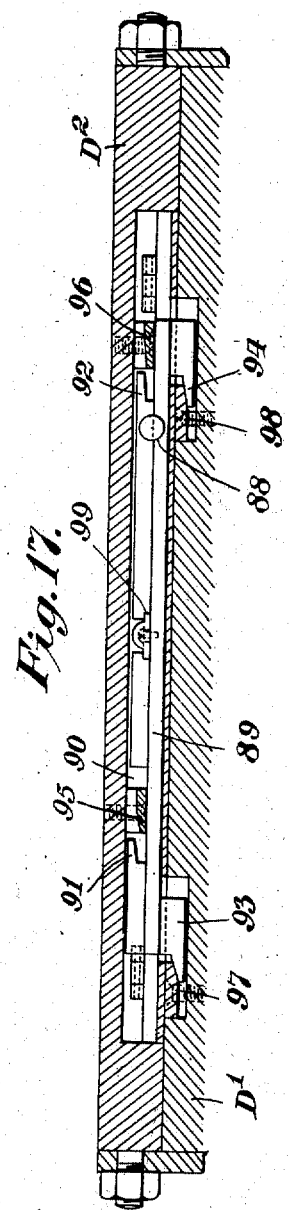
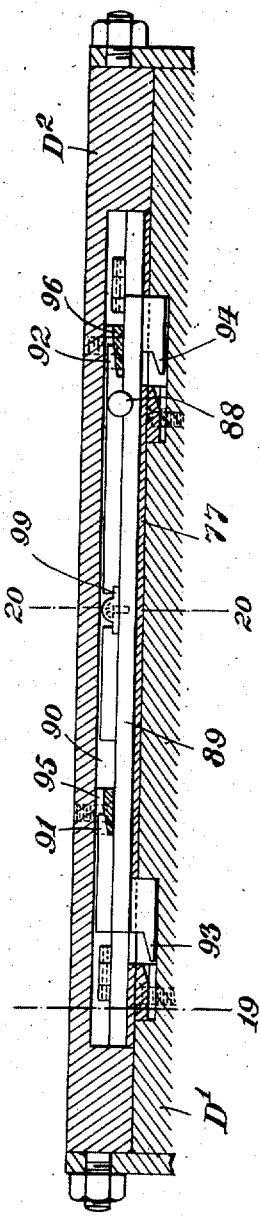
Attest:
Inventor:
Charles Edward Hopkins
by Reddington Dale & Greeley
Attys.

C. E. HOPKINS.
APPARATUS FOR CASTING CURVED STEREOTYPES.
APPLICATION FILED FEB. 19, 1907.
980,419.
Patented Jan. 3, 1911.
16 SHEETS—SHEET 13.
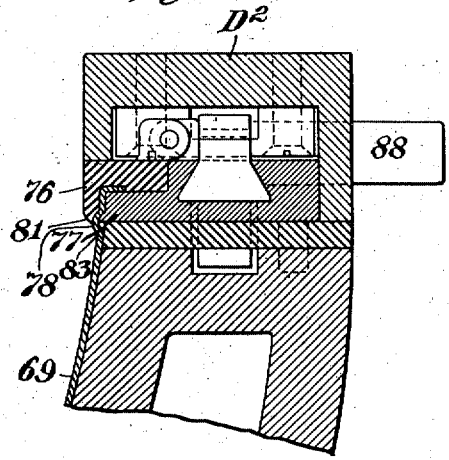
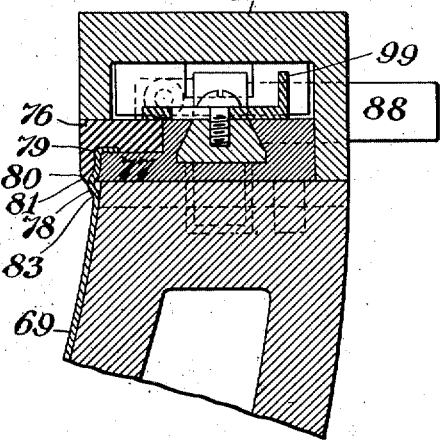
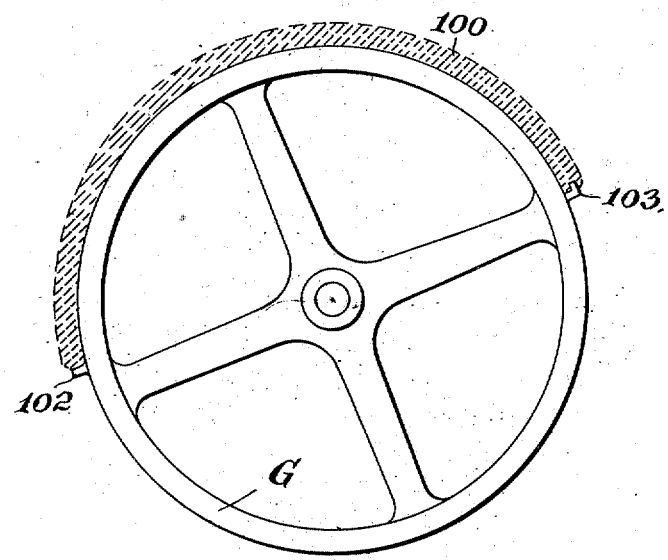
Attest:
Edgeworth Greene
Lucius E. Varney
Inventor:
Charles Edward Hopkins
by Redding Kiddle & Greeley
Attys.

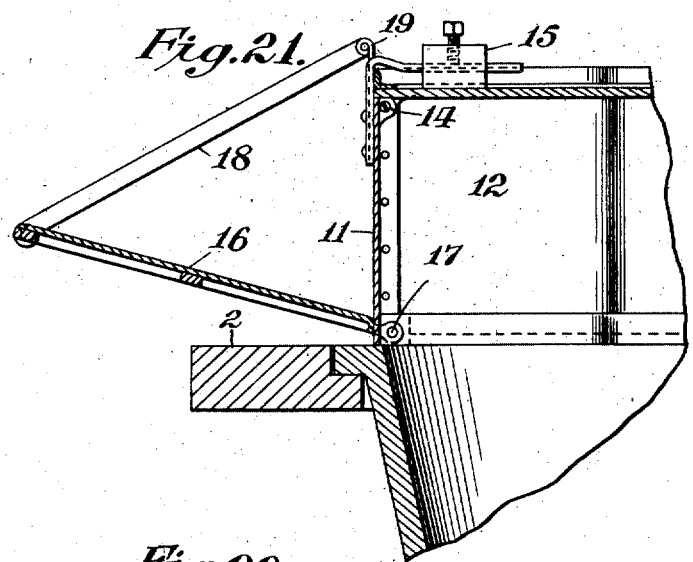
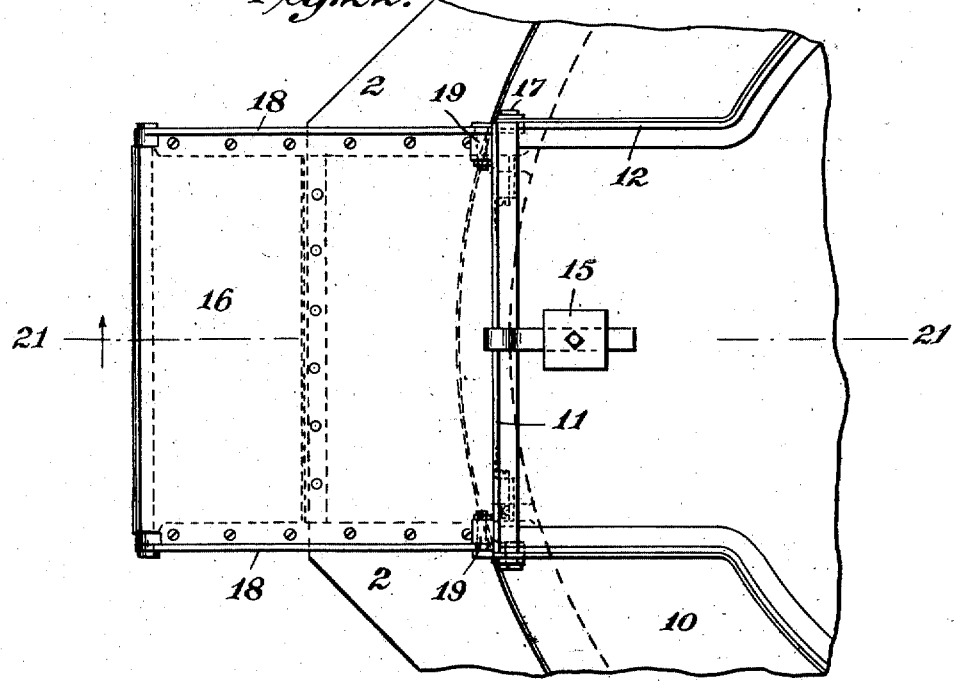

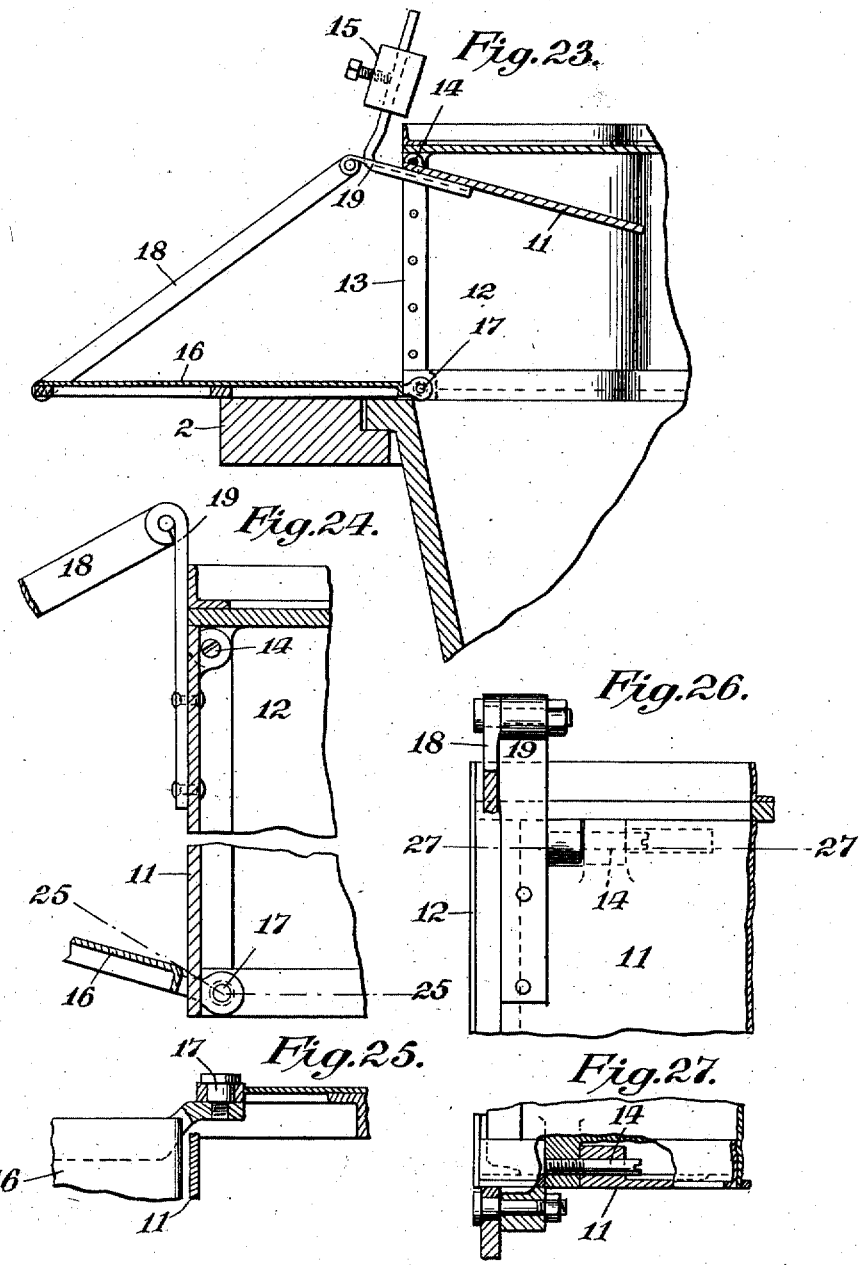

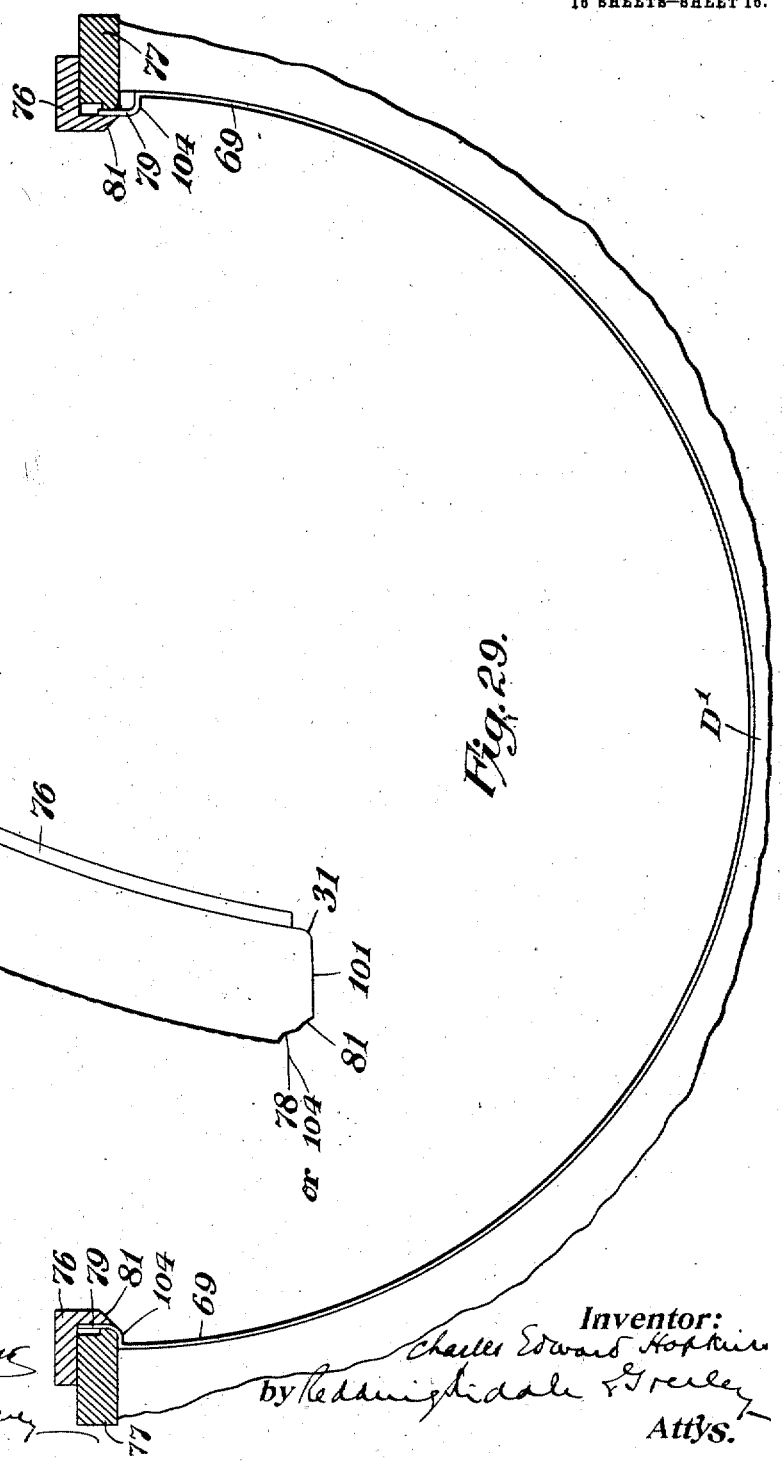

UNITED STATES PATENT OFFICE

CHARLES EDWARD HOPKINS, OF WORCESTER, MASSACHUSETTS.

APPARATUS FOR CASTING CURVED STEREOTYPES.

980,419.  Specification of Letters Patent. Patented Jan. 3, 1911.

Application filed February 19, 1907. Serial No. 358,194.

*To all whom it may concern:*

Be it known that I, CHARLES EDWARD HOPKINS, a citizen of the United States, and resident of Worcester, in the county of Worcester and State of Massachusetts, but at present residing at 38 Camberwell new road, in the county of Surrey, England, engineer, have invented new and useful Improvements in Apparatus for Casting Curved Stereotypes, of which the following is a specification.

The present invention consists of improvements in apparatus for casting curved stereotypes, these improvements being particularly, but not exclusively, applicable to the machine described in the specification of British Letters Patent 12850 of 1903.

Figure 1:
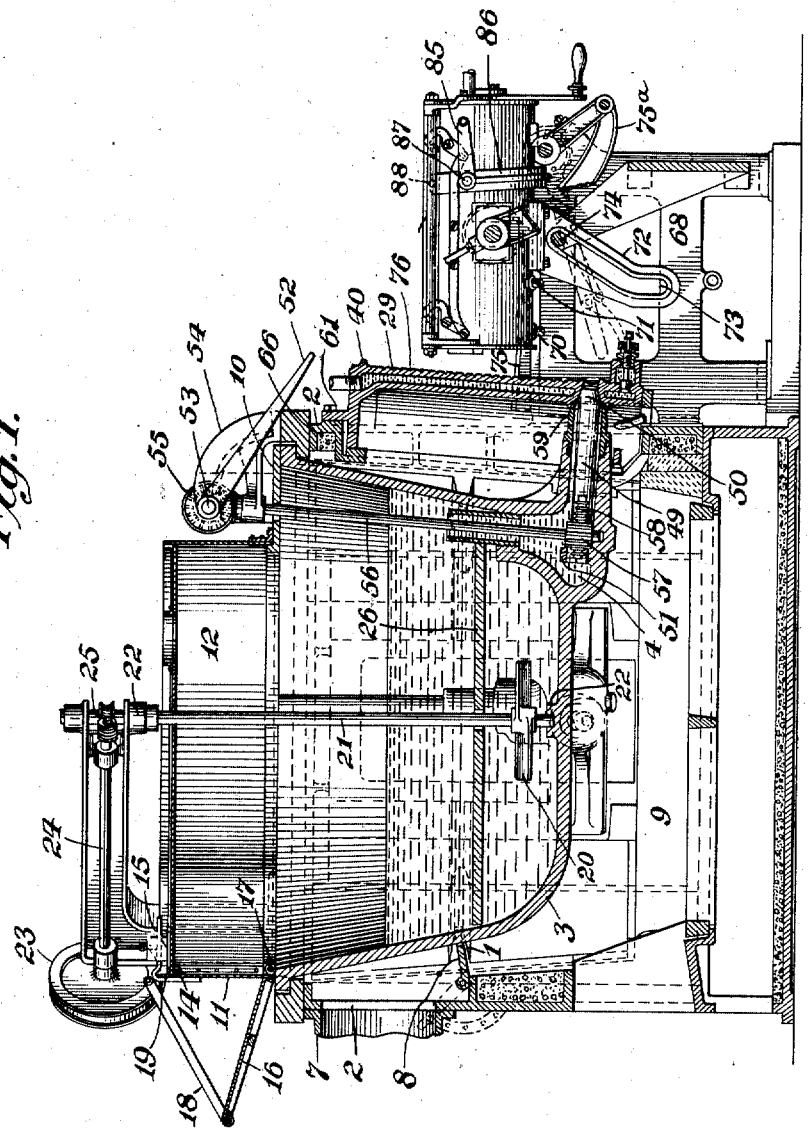
Figure 2:
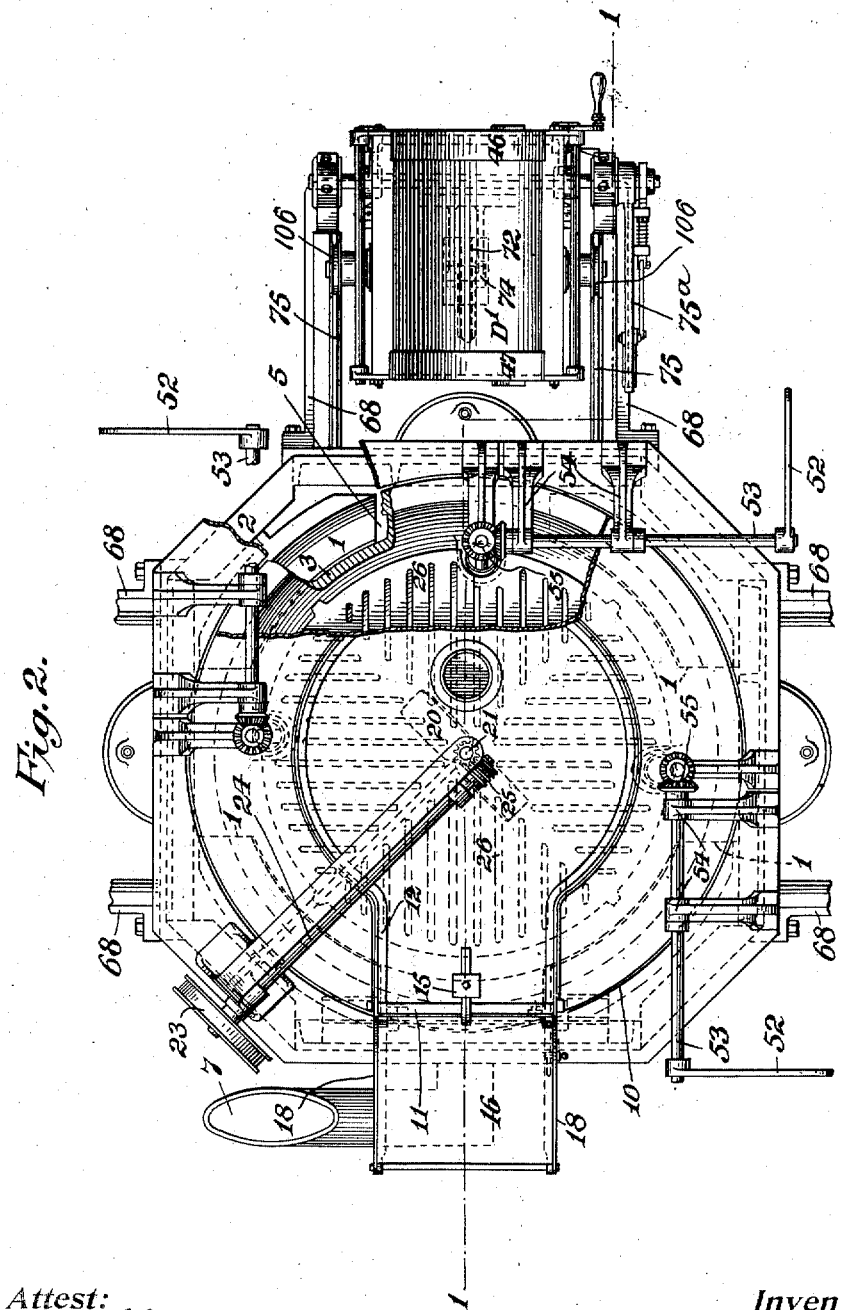
Figure 3:
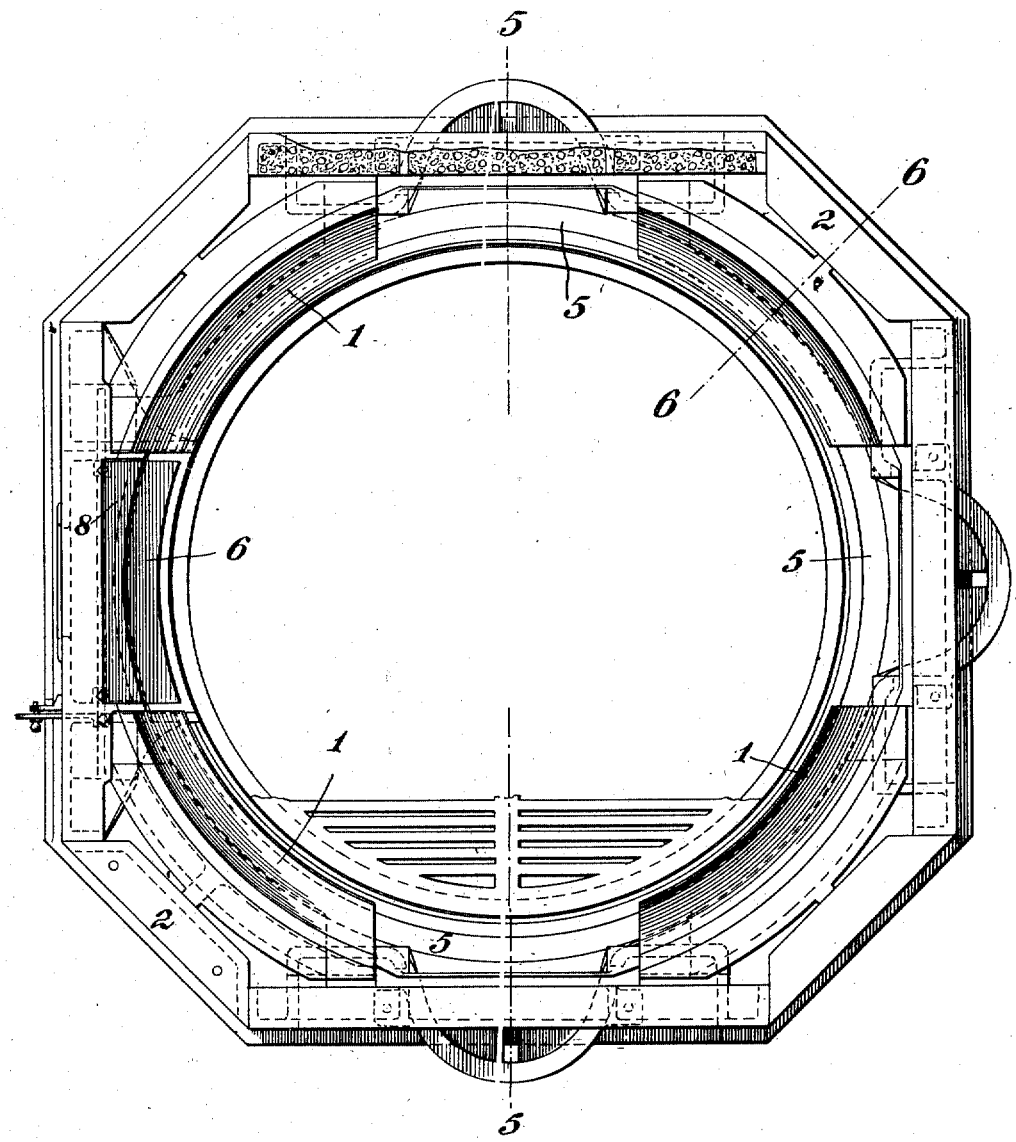
Figure 4:
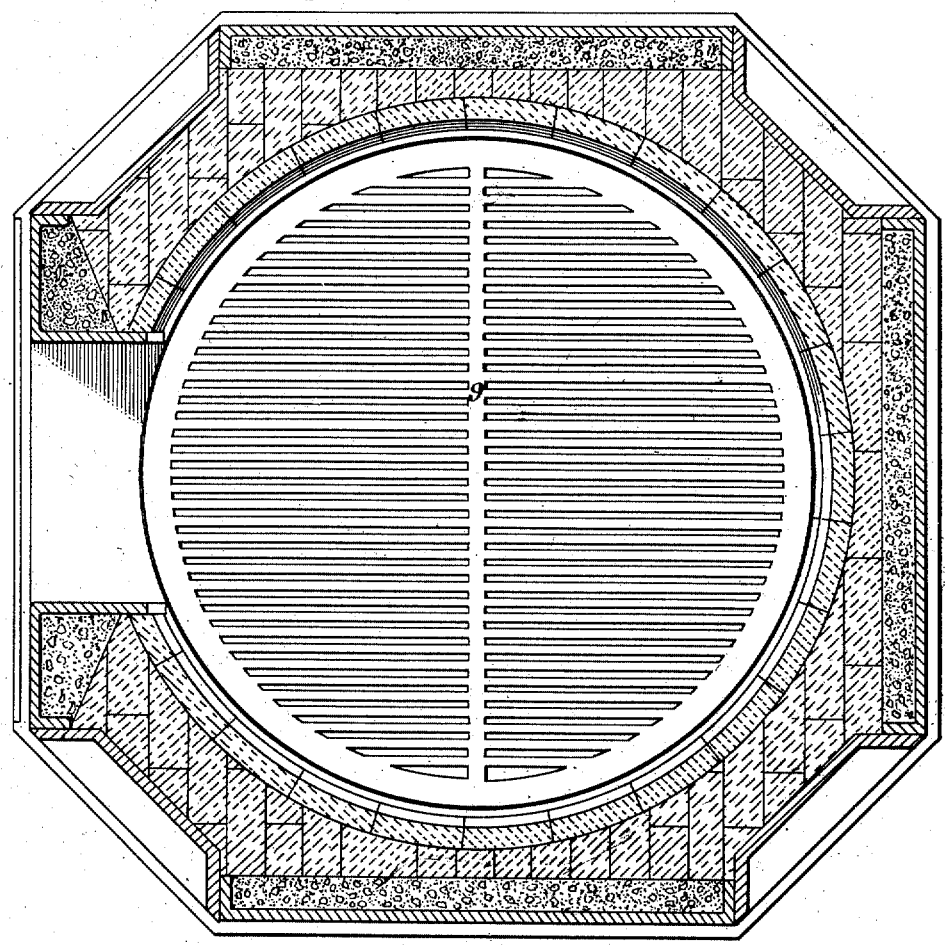
Figure 5:
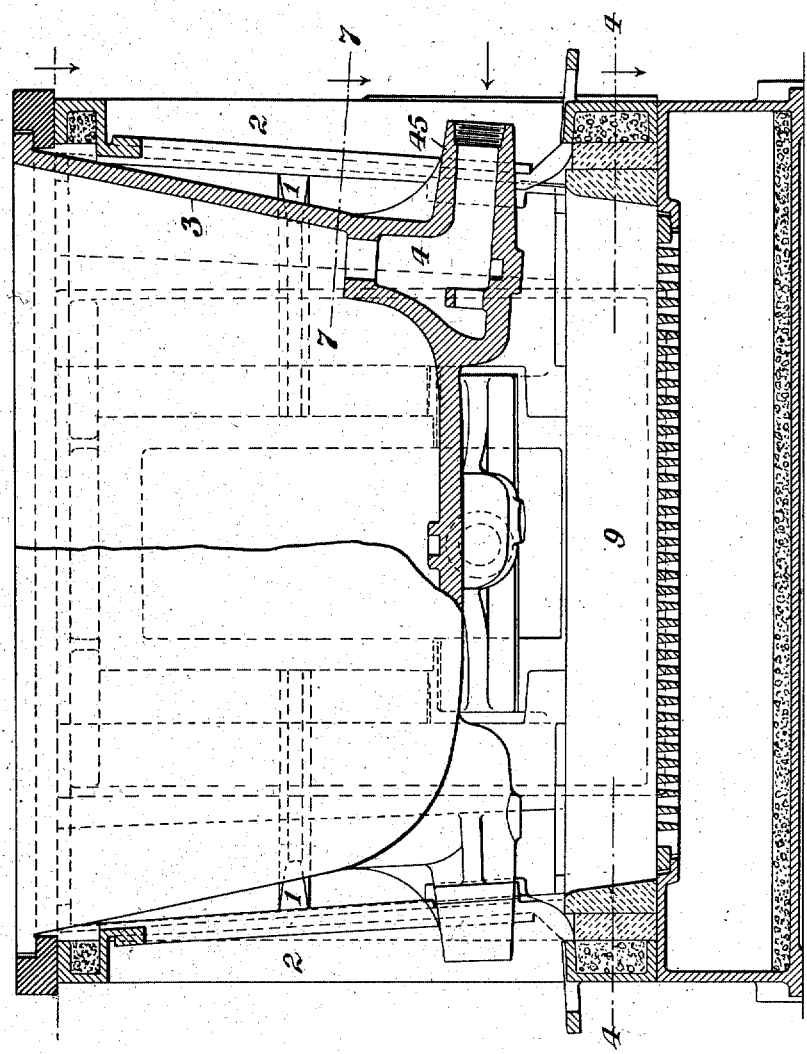
Figure 6:
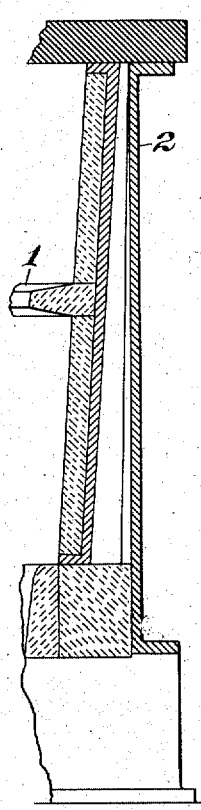
Figure 7:
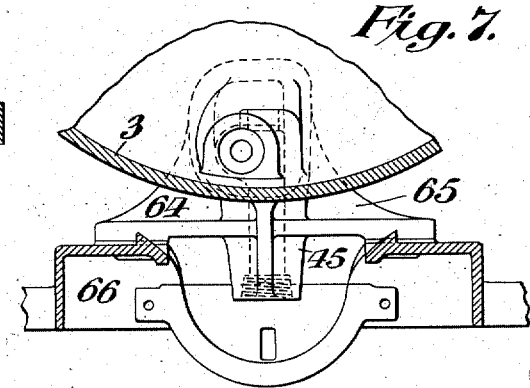
Figure 8:
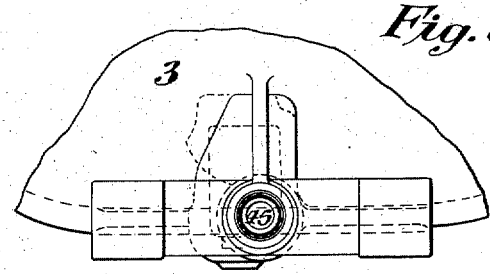
Figures 14, 15, 16:
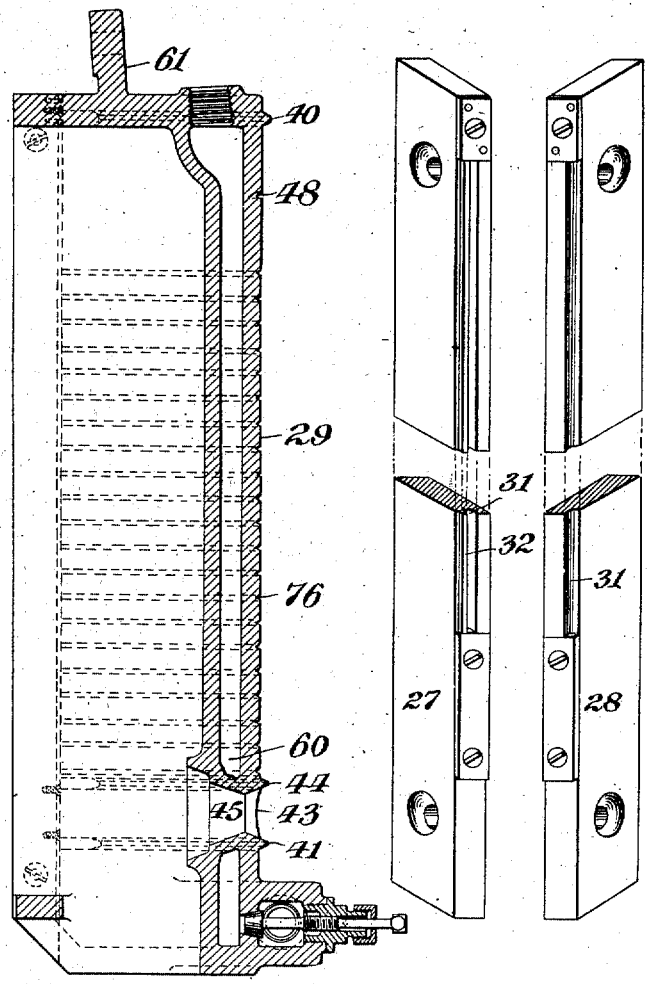

Referring to the accompanying drawings which are to be taken as part of this specification and read therewith, Figure 1 is a sectional side elevation of the apparatus on the line 1—1 of Fig. 2. Fig. 2, a plan corresponding therewith with part of the metal pot cover broken away. Fig. 3, a plan of the furnace omitting the metal pot; Fig. 4, a sectional plan on the line 4—4 of Fig. 5; Fig. 5, a sectional elevation on the line 5—5 of Fig. 3; Fig. 6, a section on the line 6—6 of Fig. 3; Fig. 7, a detail section on the line 7—7 of Fig. 5; Fig. 8, a detail front elevation of the metal pot looking at it in the direction of the arrow in Fig. 5; Fig. 9, a sectional side elevation including the front of the metal pot, the cope and the drag, the latter being in the casting position; Fig. 10, a vertical section on the line 10—10 of Fig. 11; Fig. 11, a horizontal section including part of the metal pot, the cope and the drag; Fig. 12, a front elevation of the cope; Fig. 13, a sectional plan on the line 13—13 of Fig. 12; Fig. 14, a vertical section on the line 14—14 of Fig. 12, looking in the direction of the arrow; Figs. 15 and 16, perspective views of the two side bars; Fig. 17, an enlarged longitudinal section of a matrix clamp in the unlocked position. Fig. 18, an enlarged longitudinal section of a matrix clamp in the locked position. Fig. 19, a further enlarged section on the line 19—19 of Fig. 18; Fig. 20, a further enlarged section on the line 20—20 of Fig. 18; Fig. 21, an enlarged detail sectional side elevation of a self-closing feed door in the closed position taken on the line 21—21 of Fig. 22. Fig. 22, a plan of Fig. 21. Fig. 23, an enlarged detail side elevation of a self-closing feed door in the open position. Fig. 24, a detail sectional side elevation of the pivots of the said door and platform. Fig. 25, a sectional plan on the line 25—25 of Fig. 24; Fig. 26, an elevation of Fig. 27. Fig. 27, a sectional plan in the line 27—27 of Fig. 26. Fig. 28, a detail front elevation illustrating the coöperation of the cylinder G and its two bars in respect of supporting the stereotype. Fig. 29, a transverse sectional elevation illustrating a modified form of matrix clamp; and Fig. 30, a detail section of part of a stereotype, the reference numbers on it referring to the organs of the apparatus which form the respective contours.

*Regulation of draft over the metal pot sides*—Figs. 1, 2, 3, 5 and 6.—There is a baffle 1 (preferably of fire brick) extending laterally from the metal pot and furnace frame 2 inwardly up to the metal pot 3, there being the usual distance between the two. It is situated rather nearer to the metal pot bottom than to the top thereof and is continued around the metal pot, excepting just over the valve chamber 4, where there is a port 5 for the draft. There is a similar port 6 in the baffle 1 next to the smoke flue, *e. g.*, 7, the latter being above the baffle 1, and this second port 6 is provided with a damper 8. This damper 8 is kept open until the metal in the pot 3 is melted, and then closed; thereby forcing the most intense heat of the furnace *e. g.* 9, upon the valve chamber 4, which with the valve and the valve nozzle, is therefore kept as hot as is desirable during the time the casting is proceeding. It is desirable for the sake of a maximum output and compactness to arrange as many combinations of cope, drag and their complementary parts about a single furnace as there is room for, all the combinations to be capable of being in operation at the same time. Three is a convenient number as indicated by the presence of three frames 68 in Fig. 2, and three ports 5 in Fig. 3. As all the combinations of cope, drag and their complementary parts, are replicas of each other, only one has been illustrated.

*Metal pot cover, feeding door, and metal stirrer*—Figs. 1, 2, 3 and 21 to 27.—The metal pot 3 is fitted with a permanent cover 10 to keep the heat in. To enable the cover to do this, it is fitted with a self-closing feeding door 11. The latter is attached to one side of a raised middle portion 12 of the cover 10. The doorway 13 is formed in the said side, the door 11 being pivoted by pivots 14, 14 to the top of the cover 10 and opening inward. The door is fitted with an external counterpoise 15 to hold it closed, the counterpoise then resting over the top of the raised middle portion above mentioned. A platform 16 is pivoted by its rear edge to the door sill by pivots 17, and has its front edge connected by links 18, 18 to posts 19, 19, projecting upward from the top of the door 11. So long as the latter is held closed by the counterpoise 15, the platform 16 slopes downward toward the doorway 13. When a feed of metal is put on the platform 16, its weight forces the latter down upon the top of the metal pot frame 2 and opens the door 11, the platform 16 being then horizontal. The feed is then pushed through the doorway 13, whereupon the counterpoise 15 shuts the door 11, and returns the platform 16 to its normal or sloped position.

The stirrer consists, substantially as heretofore, of a rotating body 20 formed like a propeller, carried near the bottom of the metal pot 3, on the bottom end of a vertical shaft 21 turning in suitably supported bearings 22, 22, and driven at the necessary speed by suitable means, such as a driving pulley 23 on a shaft 24 and a worm and worm wheel 25. The present invention combines with the above stirrer, but beneath the lowest level of the molten metal in the metal pot 3, a fixed grating 26 upon which the metal feed drops and which also prevents the molten metal being whirled around the pot by the stirrer, the metal circulating vertically through the grating instead.

The two side bars $D^4$, $D^4$ of the said Patent 12850/03, were carried by the plate or stereotype carrying frame $D^2$, and each side bar overhung the bottom $D^1$ (when it was down upon the latter) far enough to fit up to the respective side edge of the cope in the casting position, for the purpose of closing the mold down the respective vertical edge, which it did with a face so beveled that the convex face of the stereotype was not so wide arcually as the concave side. This beveling down each side of the stereoplate was a drawback for this reason. The form cylinder of a rotary printing machine has a stop bar parallel with its axis on each side of it, and a beveled side of a stereoplate fitted up to each stop bar when it was mounted on the printing machine cylinder. Consequently, the space between the respective stop bar and end of the stereotype could not be used to carry type, whereby the practicable height of the printing columns was shortened accordingly. According to the present invention—see Figs. 11 and 13 to 16—what may be called a portion 27, 28 of each side bar, rectangular in cross section (except for the small angle 31 described farther on), is separated from the rest, and is made fast to or integral with the cope 29, being recessed thereinto and projecting therefrom across the mold 30 for nearly the full width of the latter, where the matrix clamp fits up to it metal tight, as shown in Fig. 11. The said portions are cut away next to the mold, but so as to present a straight face 101 across it (except for the ridge 32 on the portion 27 described farther on); said face and the convex side of the mold being connected by a surface or concave face 31 which is adapted to produce a rounded edge in the cast plate instead of a sharp edge as before, which sharp edge had to be removed to prevent it cutting the hands of those who had to handle the stereotype.

The two side bar portions 27, 28 abovementioned, being fast to the cope 29, are not brought by the plate holding frame $D^2$ down upon the cylinder G—Fig. 28—which supports the stereotype during the process of cutting off the riser, and valve slug and beveling the ends of the stereotype.

*Stereotype holding cylinder*—Figs. 11, 15 and 28.—The room made by the absence of the side bar portion 28 (the right hand one in the casting position) from the stereotype carrying frame $D^2$, is now occupied by a flat topped bar 102 fast on the cylinder G parallel with its axis, and upon which bar the respective side edge of the stereotype 100 rests. The opposite side bar portion 27 has a rib 32 projecting into the mold 30 when the drag is in the casting position, as shown in Fig. 11, to form a groove down the respective side edge of the stereotype. The cylinder G has an angle bar 103 upon it opposite the bar 102, the said bar 102 and angle bar 103 meeting the respective side edges of the stereoplate 100 as the cylinder G and plate carrying frame $D^2$ approach each other, the projecting edge of the angle bar 103 engaging in the groove in the stereotype 100 whereby the latter is held up to the said cylinder G, the cylinder pins $p^8$ and sockets $p$ of the Patent 12850 of 1903 being dispensed with in the present cope 29. It has often happened that a stereotype made under the previous patent has stuck so close to the end sections $e^1$ of the stereotype carrying frame $D^2$ and the corresponding part of the matrix 69, that the act of stripping has actually bent the stereotype backward. Such bending is now prevented by the engagement between the angle bar and groove just described. The groove is further used to cooperate with a ridge adapted to act as a guide for the stereotype as it is being traveled through the cylinder of the stereotype finishing machine, and which latter forms no part of the present invention. The bar 102 may be replaced by an angle bar as 103 and the side bar 28 have a ridge 32 to correspond with the side bar 27.

*Top and bottom of the mold*—Figs. 10 and 12 to 14.—The convex face of the cope 29 has two transverse ridges 40, 41 to do the work of the end bars D⁵, D⁵ of the previous patent, as closers of the top and bottom of the mold, respectively, so that there are now no end rings on the stereotype carrying frame D² in close engagement with the two ends of the stereotype. The latter will, therefore, part from the said frame more readily than before. The top ridge 40 may be detachable from the cope 29, so that in the event of either the metal pot or the metal delivery getting out of order, the mold 30 may be used open at the top, when it can be filled with a hand ladle. The cope 29 has also an intermediate ridge 42 which with a bottom ridge 41, forms a metal distributing chamber 43. This intermediate ridge 42 has its radial width reduced on each side of a central portion 44 of it that stands over the nozzle 45 that delivers the metal, such portion acting as a baffle to prevent the metal splashing upward and thereby producing defects in the printing face of the stereotype, the metal being compelled to flow upward steadily through the ports formed on each side of the baffle 44 by the reduced radial width. The baffle 42 may be dispensed with, in which case there will be only one arcual port, the radial width of the ridge 42 being such that the clear way through the said port is not more than, and preferably less than, that of the nozzle 45, so as to make the metal distribute evenly through the chamber 43. The three ridges 40, 41, 42 do not project into the mold 30 far enough for the bottom D¹ to be in touch with them when it is in the casting position, but it has curved flat semicircles 46, 47, that bear against them, so that the ridges press the said semicircles to the bottom D¹.

*Web on the concave face of the stereotype*—Figs. 10 12 and 14.—The top end of the cope has a transverse groove 48 in it (or projection on it) which forms a corresponding web on (or cavity in) the concave face of the stereotype 100 or its riser, in order that the stereotype finishing machine above mentioned may take hold of this web (or cavity) to pull the stereotype lengthwise through it.

*Valve and valve mechanism*—Figs. 1, 2 and 10.—The presence of the metal distributing chamber 43 permits of the use of a single valve delivering under the baffle 44 above mentioned, in the place of the two valves and neither baffle nor distributing chamber of the previous patent. The single valve consists of a straight plunger 49 circular in cross section and having a tapered nose 50 adapted to fit in a corresponding annular seating in the cope 29. The plunger 49 is situated horizontally or nearly so, and works in a suitable guide 51 in the valve chamber 4 which is formed on the front of the metal pot 3. The necessary reciprocating motion is given to each plunger 49 by a hand lever 52 fast on a shaft 53 turning in brackets 54 on the metal pot frame 2, a pair of miter gears 55 connecting the respective handle 52 to a vertical rod 56 and a pinion 57 on the bottom end of the said rod engaging with a row of teeth 58 on the side of the plunger 49. This valve mechanism is much simpler than the toggle mechanism of the previous patent, which necessitated hand holes in the sides of the valve chamber to enable the erector to get at the connections of that mechanism. The plunger 49 and valve chamber 4 too, are more easily accessible, because as the cope 29 is detachable from the metal pot frame 2, the said plunger can be taken out after the cope 29 has been detached, by taking hold of the plunger nose 50 previously protruded to afford a hand hold, the plunger being throughout of less diameter than the nozzle 45. The front of the valve chamber 4 stops short of the concave face of the cope 29 and the intervening space is occupied by a nozzle 59 surrounding the plunger and extending only a short distance into the cope 29, preferably nearly up to the valve seating 51ᵃ which is not formed in the face of the cope, so that the cooling chamber 60 comes close up to the said seating. The advantage of this arrangement is that the cooling of the stereotype close to the valve seating 51ᵃ proceeds as rapidly as elsewhere. The nozzle 59 may be either incorporate with the nozzle 45 or be attached to it. The valve seating 51ᵃ is surrounded by the cooling chamber 60 and the hot gases from the furnace 9 do not get near enough to the valve seating 51ᵃ to interfere with the well-known action of the cooling water in the way of congealing an annulus of metal between the plunger nose 50 and its seating 51ᵃ whenever the latter may stand open a little.

*Providing for the cope 29 moving with the expansion and contraction of the metal pot*—Figs. 1, 2, 7, 9, 10, 12, 13 and 14.—There are lateral projections or lugs 64, 65—Fig. 7—on the metal pot 3 close to the valve chamber, and to these is somewhat loosely attached a vertical frame 66 to which the cope itself is fixed by lugs 61, 62, 63 and bolts, instead of directly and only to the furnace as in the previous patent. The cope 29 will now move in and out with the expansion and contraction of the metal pot 3 and as the valve chamber 4 and nozzle 45 are carried by the latter, the fit of the latter to its seating 67—Fig. 10, will not be interfered with. The drag supporting frame 68 is also fixed to the vertical frame 66 and therefore moves with it and as the bottom D¹—Fig. 2—is pivoted on the frame 68, it must move with the metal pot 3 and cope 29, so that the fit of the bottom $D^1$ up to the cope 29 will not be interfered with.

*Maintaining the bottom $D'$ at the best working temperature throughout its length—Figs. 1 and 9.*—If the bottom is too cold when a stereotype is cast, it sweats. The moisture then creeps through the matrix 69 and spoils the printing face of the stereotype. As the presence of the nozzles 45 and 59 prevent the cope 29 having a cooling chamber exactly opposite them, time has been lost in waiting for the valve slug (the bottom part or tail) of the stereotype, to cool. The present invention therefore provides the bottom $D'$ with one separate water circulation 70 positioned to stand opposite to and to the right and left of the said nozzles when the drag is in the casting position and having a separate supply and waste, flexible connections, and regulating taps. 71 is a separate water circulation for cooling the remaining portions of the stereotype. By these means, the sweating of the part of the bottom $D'$ in front of the printing face of the stereotype, is prevented, because the part will now be kept at a proper temperature; and that part of it that is next to the nozzles can be kept as cool as possible.

*Turning the drag $D$ up into the casting position and withdrawing it therefrom—Figs. 1, 2, 9 and 10.*—In the previous patent, this was effected in part by a slotted guide $f^8$ and a stationary rod $f^9$. As the said guide was fixed close to the tail end of the drag D, the first part of its motion from the cope was arcual and this direction of the motion had the effect of sometimes making the stereotype bind in the transverse grooves in the said cope, and would also make it bind against the transverse ridge 42 which the present invention places above the metal distributing chamber 43. According to the present invention, the slotted guide 72 is longer than before, preferably more inclined to the rear from its junction with the bottom $D'$ downward (although it may be perpendicular to the bottom) and terminates in a portion 73 that is at right angles with the said bottom. Further, it is fixed to this bottom $D'$ midway, or nearly so, of its length, and when the bottom is horizontal, it is the then top of the slot and not the bottom of it, that is near to the stationary rod 74. The consequence is that the operation of the toggle $75^a$ turns the bottom $D'$ upward on the rod 74 as on a pivot, the inclined portion of the guide 72 sliding on the said rod. At the moment when the angle made by the junction of the said inclined portion with the portion 73, reaches the rod 74, the bottom $D'$ and the portion 73 are parallel with the cope 29 and the rollers 106 on the sides of the said bottom have traveled to the rear ends of the horizontal portions of the ways 75. It must be remembered that the cope 29 is not vertical but inclined to the front and that the ridge 42 and the groove 76 on and in its face, as well as the inclined portions of the ways 75, are still at right angles with the front of the cope, as in the previous patent. The continued operation of the toggle $75^a$ moves the bottom $D'$ up the inclined portions of the ways 75, and the portion 73 of the guide 72 over the rod 74. The plunger 49 is now opened whereupon metal flows into the mold 30, filling up the nozzle 45, the intermediate chamber 43 and the grooves 76, and surrounding the ridge 42, after which the plunger 49 is closed. The stereotype 100 then sets hard. It is probably now connected to the metal in the valve chambers 4 by an annulus of metal which may have been left between the plunger nose 50 and its seating $51^a$. Whether this connection is present or not, the ridges that have been formed in the grooves 76, used to contract upon the cope and wedge themselves tightly therein, so that when the operator reversed the toggle $75^a$ to withdraw the bottom $D'$ and the stereotype 100 from the cope C, the top of the bottom would move away from the cope before the lower portion of it had begun to move, the bottom as a whole pivoting on the rod $f^9$ of the previous patent. It would do this all the more readily, because the rod $f^9$ and the coöperating guide $f^8$ were beneath the line in which the toggle was pulling. This pivoting of the bottom $D'$ had the effect of wedging the ridges on the inner face of the stereotype, in their grooves 76 in a vertical sense, which wedging was a further obstacle to the bottom and stereotype being withdrawn from the cope. But as the guide portion 73 and rod 74 are nearly in the line of the pull of the toggle, the above described rocking on the part of the bottom $D'$ and wedging of the ribs in the grooves 76 are now prevented by the presence of the rod 74 in the guide portion 73, this presence serving to make the bottom $D'$ maintain its parallelism with the cope C until after the stereotype has cleared it. Consequently, both the stereotype 100 and the bottom $D'$ are withdrawn from the cope easily and move together smoothly down the inclined portion of the ways 75.

*Matrix clamps—Figs. 11, 17 and 29.*—The casting bar portion 76 of an improved matrix clamp does not project so far toward the center line of the drag as in the previous patent, being now only long enough in this direction to fit up to the adjacent face of the respective side bar portion 27, 28—Fig. 11—and has only a short bevel 80—Figs. 11, 19 and 20—the result being that when the frame $D^2$ and matrix 69 have to be separated from the stereotype 100 when the latter is on the cylinder G—Fig. 28—preparatory to the said frame and matrix being returned to the bottom D', the shortened bevel 80 clears the respective side edge of the stereotype 100 more readily than the longer bevel of the previous patent could. A side edge or margin 79 of the matrix 69 is clamped as shown in Figs. 19 and 20 between the horizontal as well as between the vertical faces of the two members (casting bar 76 and bottom bar 77) of the matrix clamp.

A matrix 69 had heretofore a hollow convex ridge or bolster 78, formed along each side. The lip 81 of the casting bar 76 would extend half way across this bolster, and the nose 82 of the bottom bar 77 was prolonged and convexed to enter and fit into the concavity of the said bolster. This arrangement would be satisfactory so long as all the matrices were of the same width. But if a matrix were narrow, one bolster 78 would stand low in the bottom D' and some of the flat matrix margins 79 above the bolster would, consequently, be clamped between the concavity in the casting bar 76 and the convexity on the bottom bar 77. This might happen with both margins. In either case, the matrix 69 would be either cracked or pulled off the said bottom D'. To prevent this and to meet the case of matrices varying in width, the opposite operative vertical faces of both casting bar 76 and bottom bar 77, are now flat as shown in Fig. 29. The margins 79 of the improved matrix are so positioned with reference to the latter as to stand above the indented face of it when it lies flat, and being flat to correspond with the operative faces of the clamp, the latter can grip any portion of the said margins without damaging them or pulling the matrix off the bottom D'. Fig. 29 makes this clear. The matrix 69 was wide enough to present the whole left hand margin between the jaws 76, 77 of the respective clamp but only a portion of the right hand margin between the jaws of the right hand clamp; but this suffices. Each margin 79 is connected to the matrix 69 by a convex shoulder 104 which projects into the mold 30 when the matrix is in the casting position, so that there will be a groove down each side of the stereotype 100 close to the type surface of it, and trimming along there is saved, because the grooved surfaces will be well out of the way of the inking rollers of the printing machine—see Fig. 30. The convex shoulders 104 may be replaced by inclines.

*Locking or unlocking the two matrix clamps to or from either the stereotype carrying frame $D^2$ or to the drag $D$*—Figs. 1, 9, 10, 11, 18 and 19.—This is now accomplished, by preferably a single handle 85 instead of by a rod on each side of the stereotype carrying frame $D^2$. This handle 85 is fast to a yoke 86 that passes under the drag D and has its sides pivoted to the respective sides of the drag bottom D' by a pivot 87 on each side of the latter. Each end of the yoke embraces a stud 88 on a single bar 89 sliding in a slot 90 in the respective matrix clamp, and carrying a pair of hooks 91, 92 on its top side and a like pair 93, 94 on its under side, all being parallel with the bar, those—91, 92 on the top side, pointing toward one end of the bar 89 and those—93, 94—on the under side, pointing toward the opposite end of the said bar, the hooks 91, 92 adapted to engage with the respective ledges 95, 96 on the stereotype carrying frame $D^2$ and the bottoms 93, 94 with the respective ledges 97, 98 on the bottom D'. When the top hooks 91, 92 are in engagement with the frame $D^2$, the bottom ones 93, 94 are out of engagement with the bottom D', and vice versa. The engaging faces of both hooks and ledge are tapered to automatically take up wear. The two side bars 89, 89 may be operated independently of each other as in the previous patent, in which case the yoke 86 and its handle 85 will not be required.

*Fitting the matrix 69 in the bottom D'*— Figs. 17 to 20.—Obviously this must be done while the stereotype carrying frame $D^2$ is off the bottom D', the matrix clamps being then on the respective side (or top, for the drag D is then horizontal) edges of the said bottom. But this necessitates a device by which one margin of the matrix can be clamped preparatory to fixing it in casting position on the bottom D'. This device consists, preferably, of a transverse slide 99 working across each matrix clamp and adapted to press the casting bar 76 of it down upon the respective bottom bar 77, thereby pinching the matrix 69 between them. There is one of these devices on each matrix clamp, to prevent the natural resilience of the matrix 69 pushing the two casting bars 76 away from the respective bottom bars 77, when the stereotype carrying frame $D^2$ is off the bottom D'.

*Stereotype carrying frame $D^2$.*—It has already been explained that the mold is, according to the present invention, closed at both top and bottom, by ridges 40 and 42 on the cope 29 instead of by the end bars $D^5$, $D^5$ as in the previous patent. According to the present invention, the thick semicircle $D^6$ is replaced by a thin one 47 of steel or equivalent metal, and which overlaps the matrix 69. The top of the frame $D^2$ has a similar semi-circle 46 which acts in the same way, so that both ends are, when the mold is closed, pressed by the respective ridges 40 or 42, on the cope 29, toward the bottom D'. Both semicircles 46, 47 extend past the end bars $D^5$, $D^5$ and are flush with the outer faces of the same.

The mechanism shown in Figs. 1 and 9 for locking the stereotype carrying frame $D^2$ to the bottom $D'$ and consisting of hooks $h^3$, $h^3$, studs $h^4$, $h^4$, bar $h^5$, lug $h^7$ and studs $h^8$, $h^8$, is identical with that of the previous patent and needs no special description.

I claim:

1. In an apparatus for casting curved stereotypes, the combination with matrix clamps, of a cope having a side bar secured thereto along each straight edge and adapted to form with the matrix clamps the side closures of the casting chamber.

2. In an apparatus for casting curved stereotypes, the combination with a bottom having matrix clamps along each straight edge, of a cope having a bar along and projecting from each straight edge and adapted to form with the matrix clamps the side closures of the casting chamber.

3. In an apparatus for casting curved stereotypes, the combination of a cope having a bar secured along each edge so as to project therefrom and form part of the closure for the casting chamber, each bar presenting a long concave face to the casting chamber, and two part matrix clamps each consisting of a portion for overlapping the edge of the matrix and presenting a beveled face to the casting chamber, and a portion to support the back of the matrix.

4. In an apparatus for casting curved stereotypes, the combination of a cope having closure members for the casting chamber along its straight edges and matrix clamps adapted to project only a short distance across the casting chamber to permit a safe clearance for the plate.

5. In an apparatus for casting curved stereotypes, a pair of matrix clamps each consisting of a member to overlap the matrix said member being formed with a short bevel and adapted to project only a short distance across the casting chamber, and a portion to support the back of the matrix.

6. In an apparatus for casting curved stereotypes, a cope having a bar secured along each straight edge and projecting therefrom, one of said bars having a rib for the purpose specified.

7. In apparatus for casting curved stereotypes, the combination with a stereotype-supporting cylinder of a flat-topped bar on one side of it and an angle bar on the opposite side of it.

8. In an apparatus for casting curved stereotypes, the combination of a front face portion of the cope of a transverse ridge integral with and at the end thereof to form the end mold closure.

9. In an apparatus for casting stereotypes, the combination of a cope and back providing a casting chamber therebetween, a distributing chamber into which metal from a nozzle can be received and connecting elements between the casting chamber and the distributing chamber which form an orifice of less cross sectional area than that of the casting chamber.

10. In apparatus for casting curved stereotypes, the combination with the cope, of a transverse groove adapted to form a corresponding web on the concave face of the riser of the stereotype.

11. In apparatus for casting stereotypes, the combination of the metal pot; a vertical yieldable frame attached thereto; a cope fixed to the same frame; and drag supporting frame likewise fixed to the same frame.

12. In apparatus for casting stereotypes, the combination with a bottom, of a water circulation, to cool the valve slug of the stereotype and therefore positioned to stand opposite to the nozzle delivering metal into the mold when the drag is in the casting position, and of a second and separate water circulation, to cool the remaining portions of the stereotype.

13. In apparatus for casting stereotypes, the combination as and for the purpose set forth, of the bottom; the lengthened slotted guide having a terminal portion standing at right angles with the said bottom, the guide being fixed to the bottom about midway of the length of the latter; a stationary rod passed through the slot of the guide and positioned to be near to the top of the slot when the bottom is horizontal; and mechanism for raising the bottom up to the cope and retracting it from the latter.

14. In apparatus for casting stereotypes; the combination of drag; ledges on the latter, matrix clamp on each side edge of the drag; plate carrying frame; ledges on the latter; and a sliding bar in each matrix clamp carrying hooks adapted to engage with the ledges on the plate carrying frame, the ledges and hooks being so positioned with reference to each other that when one set of hooks is in engagment with the drag, the other set of hooks is out of engagement with the plate carrying frame, and vice versa.

15. In a stereotype apparatus the combination of a back, a plate carrying frame and a sliding bar, hook and hook engaging elements forming connections between the back and bar and also between the bar and frame such that by moving the bar to one position the bar and back will be hooked together and the bar will be unhooked from the plate carrying frame and by moving the bar to another position will be unhooked from the back and will be hooked to the plate carrying frame.

16. In an apparatus for casting stereotypes the combination of a back, matrix clamp at one side of the back, a sliding bar in the matrix clamp and a plate carrying frame, hook and hook engaging elements forming a connecting means between the back and bar and also hook and hook engaging elements forming a connecting means between the bar and the plate carrying frame, the hook and hook engaging elements of the different connecting means so arranged and shaped that by moving the bar in one direction the back and bar can be hooked together and the bar will be unhooked from the frame and by moving the bar in the opposite direction the bar will be hooked to the frame and unhooked from the back.

17. In an apparatus for casting curved stereotypes, the combination of a plate carrying frame, a back, a matrix clamp at each straight side of the back adapted to be secured to either the cope or the back when they are in juxtaposition and means carried by the back extending between and engaging the clamps to move the latter so that they can be secured to either the back or the frame.

18. In apparatus for casting stereotypes, the combination with a matrix clamp having two clamping parts of a slide working across one of the clamping parts adapted to press one part toward the other part to pinch the matrix between them.

19. In an apparatus for casting stereotypes the combination with a matrix clamp having two members pivoted together and means extending between the members to press one toward the other.

20. In an apparatus for casting stereotypes the combination of a matrix clamp having two members adapted to clamp the matrix by relative movement between the same in one direction and means extending between the members for securing said clamps by pressure transverse to said movement.

21. In apparatus for casting curved stereotypes, the combination of stereotype carrying frame; transverse ridges on the face of the cope; a thin metal semicircle 47 across the bottom end of the stereotype carrying frame and a similar semicircle 46 across the top end of the said frame.

22. In an apparatus for casting stereotypes the combination of a melting pot, a yieldable frame connected therewith, a cope fixed to the frame, a nozzle element extending between the cope and pot, the yielding movement permitted by the frame being sufficient to take care of the expansion and contraction of the nozzle and pot.

23. In a machine for casting parts used in printing the combination of a receptacle to contain molten metal a nozzle therefor a member to shape the casting held against the nozzle by means which can yield.

CHARLES EDWARD HOPKINS.

Witnesses:
   THOMAS SYMONDS,
   HERNANDO DE SOTO.